Patented Feb. 24, 1931

1,794,028

UNITED STATES PATENT OFFICE

THOMAS A. PEEBLES, OF PITTSBURGH, PENNSYLVANIA, ASSIGNOR TO JOHN M. HOPWOOD, OF DORMONT, PENNSYLVANIA

PRESSURE-CONTROL SYSTEM

Application filed January 25, 1928. Serial No. 249,481.

This invention relates to a pressure control system and more particularly to a control system for fluid pressure lines such, for example, as steam pressure lines in general use.

Due to increased economy in the operation of high pressure lines and apparatus over those operated at low pressures, modern systems are employed for use in connection with steam at a relatively high pressure. It frequently occurs, however, that a given plant will be provided with certain low pressure units and it will be apparent that the high pressure steam must be delivered thereto at a materially reduced pressure for the proper operation of the low pressure units. A reduction valve is, accordingly, provided in the steam line at the point at which it is desired to maintain the reduced pressure and this valve is controlled by a suitable regulator which may conveniently be responsive to the pressure on the low pressure side of the valve. The regulator is thus operated automatically to maintain a predetermined pressure in the low pressure line or system and the extent of opening of the regulator valve is dependent upon the demand for low pressure steam. Such an arrangement will, of course, maintain the desired steam pressure in the low pressure line, but it will not give a desirable temperature condition. For example, assuming the high pressure steam to be maintained at 275# with a 200° F. superheat, if this steam is now reduced and delivered to the low pressure line at a pressure of 150# the temperature of the reduced pressure steam will be raised to approximately 600° F. No engine employing steam at 150# pressure will stand a temperature much above 450° F., and it therefore becomes necessary to remove this excess heat or to subject the reduced pressure steam to a desuperheating operation.

An object of this invention is to provide a system for controlling the pressure and temperature of steam delivered to a low pressure line from a source of high pressure.

A further object is to provide a system of the type set forth constructed and arranged to maintain a low pressure steam line, which is supplied from a high pressure source and is subject to a varying demand, at a substantially constant pressure and temperature.

A still further object is to provide a mechanism for controlling the operation of a steam cooling device in accordance with the volume and temperature of the steam to be cooled.

A still further object is to provide a system of the type set forth of such construction and arrangement as to eliminate any heat loss as a result of cooling of the steam.

Figure 1:
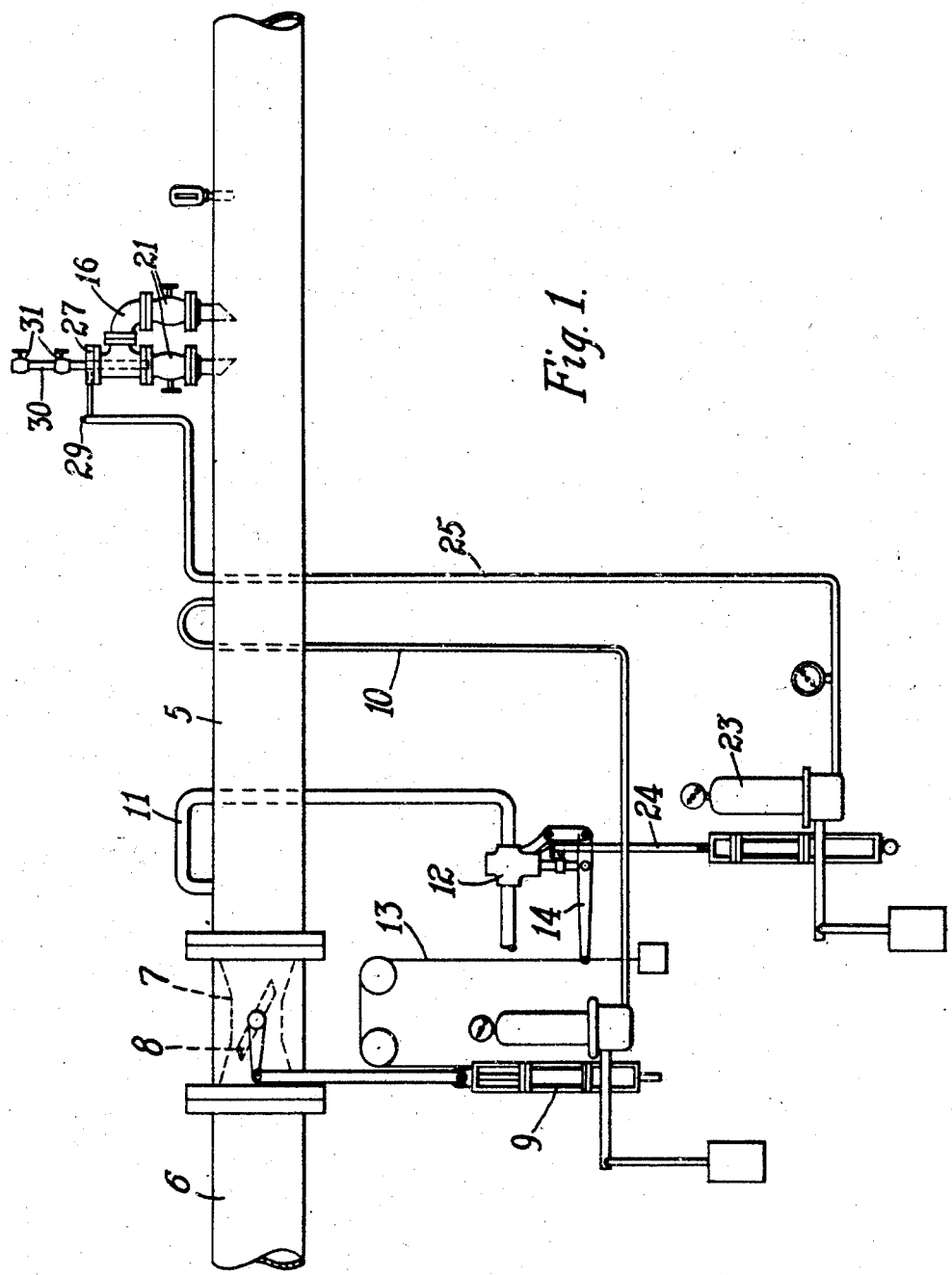
Figure 2:
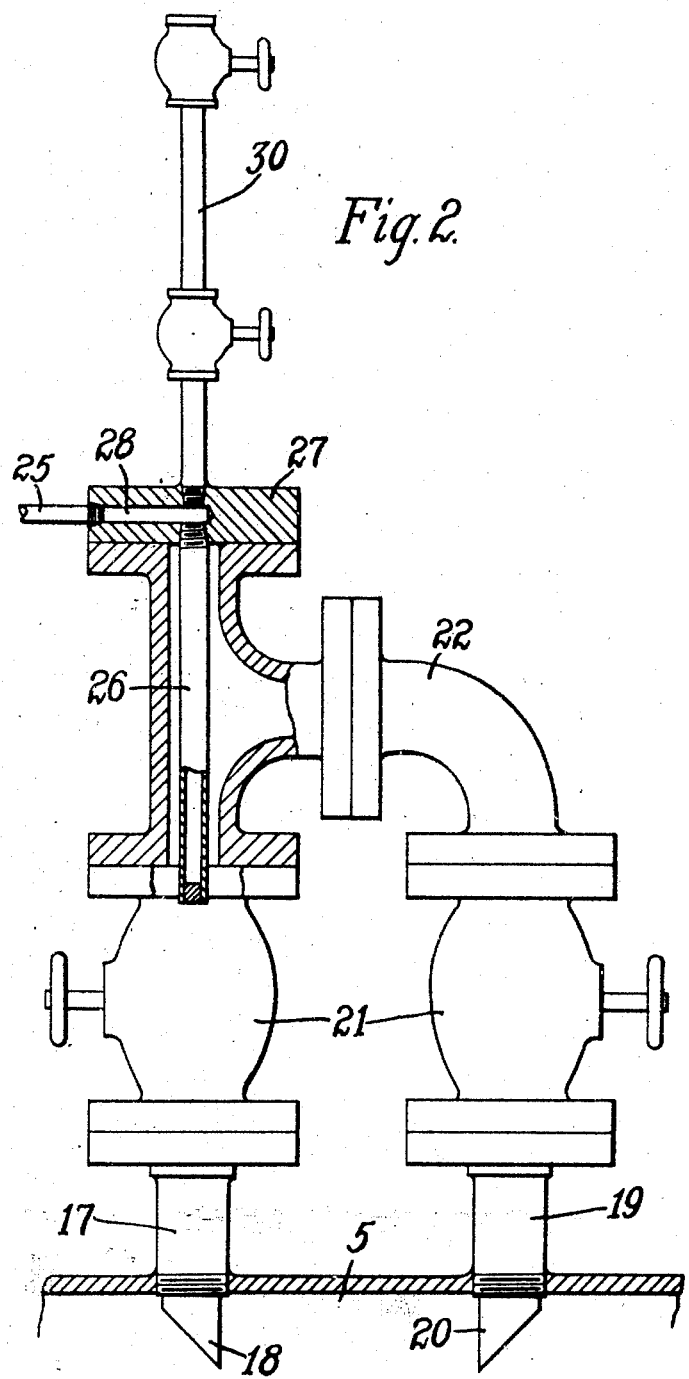

These and other objects which will be apparent to those skilled in this particular art are accomplished by means of the invention illustrated in the accompanying drawings in which Figure 1 is a more or less diagrammatic view of a fluid control system constructed in accordance with one embodiment of this invention and Fig. 2 is a view on an enlarged scale of certain of the details of Fig. 1.

The system illustrated is shown in connection with a low pressure line adapted to receive steam from any desired high pressure source. A suitable reducing valve is positioned at that point in the line where it is desired to provide a reduction in pressure and this valve is automatically operated by a pressure responsive regulator connected to the low pressure line by a suitable tap so as to maintain a substantially constant pressure in the low pressure line under a varying demand. In order to reduce the temperature of the low pressure steam sufficiently to permit the efficient operation of the associated low pressure units, mechanism for injecting a cooling spray of water into the low pressure steam is provided at a point just below the pressure reduction valve where the steam is moving at a very high velocity and where the water spray will be immediately broken up into very finely divided particles which are readily evaporated by the superheated steam. The amount of water injected is controlled in response to the volume flow of steam by connecting the steam valve operating regulator to a valve in the water supply line so that an increased flow of steam will result in an increased delivery of cooling water to the stream, and vice versa. It will be apparent that, due to the fact that the incoming steam is subject to variations in the pressure and superheat thereof and also due to the fact that the cooling water is itself subject to variations in pressure and temperature, the direct control of the water valve by the steam valve regulator is not sufficient to secure an accurate temperature control of the low pressure steam. In order to overcome this objection, the present system includes a device that is subject to the temperature of the desuperheated steam for cooperating with the reducing valve regulator in controlling and operating the water valve so that the flow of cooling water into the low pressure steam line is controlled by both the quantity of steam to be desuperheated and the actual temperature of the desuperheated steam.

As illustrated, the present invention is shown in connection with a low pressure steam line 5 adapted to receive steam from a high pressure line 6, or any other desired source. A combined venturi 7 and pressure reducing butterfly valve 8 is provided at that point in the steam line at which it is desired to reduce the pressure. This valve is operated by any desired form of regulator 9 such, for example, as the regulator illustrated in the Patent No. 1,371,243, issued to John M. Hopwood, which is connected to the low pressure line 5 through a suitable pressure tap 10, to so control the opening of the valve 8 and the volume flow of steam therethrough as to maintain a constant predetermined pressure in the low pressure line 5. Cooling water is supplied to the steam in the line 5 at a point where the steam is moving at a very high velocity by means of a water supply pipe 11 provided with a control valve 12 of any desired type, but preferably a roto-reciprocating valve such as is shown, for example, in the patent to Brown and Risser, No. 1,247,217, granted Nov. 20, 1917. The regulator 9 is flexibly connected by a weighted cord or the line, 13, to the angling mechanism 14 of the water valve. It will be apparent that the pressure reducing valve 8 is automatically operated by the pressure of the steam in the low pressure line through the regulator 9 so as to maintain a substantially constant pressure in the steam line. It will also be apparent that the supply of desuperheating water to the steam line is controlled in accordance with the volume flow of steam by the connection of the water valve 12 with the steam valve regulator 9.

As above pointed out, the mechanism so far described is not sufficient to secure an absolutely accurate temperature control of the low pressure system due to variations in the pressure and superheat of the steam itself and to variations in the temperature of the desuperheating water. In order to render the system accurate, an additional mechanism for controlling the water valve 12 in accordance with the temperature of the desuperheated steam, which mechanism cooperates with the volume regulator 9 in controlling the amount of cooling water delivered to the steam line, is provided.

As illustrated, this latter mechanism makes use of the well-known Pitot tube effect which is employed in connection with various types of flow meters. At a suitable point beyond the point of water induction, a by-pass 16 is provided for momentarily diverting a small portion of steam from the steam line. As illustrated, this by-pass is provided with a by-pass inlet pipe 17, the end 18 of which within the steam line, is cut on a 45° angle so that the interior thereof is more or less facing the flow of steam. The outlet 19 of the by-pass is provided with an end 20 extending into the steam line and cut at a 45° angle so that the interior thereof faces in the opposite direction. Valves 21 are associated with both the inlet and the outlet lines and a connection 22 is provided between them. The impact of steam upon the inlet 18 tends to build up a pressure higher than the pressure of steam in the main line, while the rush of steam past the outlet terminal 20 of the by-pass tends to reduce the pressure therein. As a result, a flow of steam is produced through the by-pass and back to the steam line and the temperature of this diverted steam is employed for cooperating with the regulator 9 and controlling the water valve 12.

A second regulator 23 is connected by a link 24 to the angling mechanism of the roto-reciprocating valve and a vapor or water containing closed line 25 is connected at one end to the diaphragm of the regulator and at the other to a temperature responsive element including a hollow, closed thermo tube 26 positioned in the by-pass 16 and connected to a supporting member 27 provided with a drilled passage for connecting the pressure line 25 and the thermo tube 26. The air is exhausted from this system, formed by the line 25 and tube 26, and a certain amount of water or other liquid is introduced, the amount being slightly in excess of the amount which will be entirely evaporated at the temperature at which it is desired to maintain the low pressure line. This arrangement is similar to the heat transfer system disclosed in the co-pending application filed by me, Serial No. 105,942. The line 25 is provided with a suitable inlet 29 and a second inlet line 30 communicates with the passage 28 and hollow member 26 through the supporting member 27. The second inlet 30 is provided with double valves 31 so as to provide for the replenishing of water to the system while it is in operation.

It will be apparent that variations in the temperature of the steam flowing through the line 5 will be instantly transmitted to the thermo element 26 of the pressure line 25 and cause corresponding pressure variations in the pressure system 25, resulting in operation of the regulator 23 for corresponding control of the water valve 12. The general operation of the device is such that the increase in steam flow requires an approximately proportional increase in the volume of water required to reduce the steam to the desired temperature. This is accomplished through the connection 13 so that operation of the regulator 9 transmits a corresponding motion to the roto-reciprocating valve and varies the water supply approximately in accordance with the volume flow of steam. As above pointed out, this is not sufficient to secure an accurate temperature control so the second regulator 23 is made responsive to the temperature of the low pressure steam for cooperating with the regulator 9 in controlling the roto-reciprocating valve. As a result, when a change of steam flow occurs, there will be a change in the water supply also, and, if this is not exactly right to maintain the desired temperature of the low pressure steam, the temperature responsive regulator will be actuated so as to effect the necessary additional change in control of the water supply. In other words, the present system provides a primary regulation of water for desuperheating purposes in accordance with the quantity of steam to be desuperheated, and a secondary regulation in accordance with the actual temperature of the desuperheated steam.

The advantages of such an arrangement will be obvious to those skilled in this particular art. Attention is, however, directed to the fact that if a given quantity of superheated steam at reduced pressure is desired, it is not necessary to admit the same weight of steam from the high pressure system. Approximately 10% of the total steam delivered by the low pressure system results from the evaporation of the water admitted thereto for the purpose of reducing the steam temperature. As a result, although the steam temperature is reduced, there is no heat loss resulting therefrom.

In addition, the provision of a by-pass arrangement for operating the temperature responsive system permits the latter to be constructed of thin, light material so that the thermal capacity thereof will be as small as possible. It will be apparent that the insertion of such a device directly in the main steam line would subject it to such corrosion and wear as to cause its rapid destruction. Obviously this is avoided by operating the temperature responsive system by means of steam diverted from the main flow. However, it will be apparent that a suitable thermostatic element may be employed in the main steam line, if desired.

It will also be apparent that the dual control of a fluid pressure line may be employed in connection with other types of cooling systems than the particular one chosen for illustration.

Although I have described one system in specific detail, it will be apparent that various changes, additions, omissions and substitutions can be made therein without departing from the spirit of this invention or the scope of the appended claims.

What I claim as new and desire to secure by Letters Patent is:

1. In combination with a low pressure fluid supply system, a source of high pressure fluid, a valve for controlling the delivery of high pressure fluid from said source to said low pressure system, means for admitting desuperheating liquid into said low pressure system, a pressure responsive mechanism responsive to the fluid pressure within said system for controlling the operation of said valve and said means, and a temperature responsive mechanism responsive to the temperture of the fluid traversing said system for modifying the operation of said means, occasioned by the operation of said pressure responsive mechanism.

2. In combination with a low pressure fluid distributing system, a source of high pressure fluid, means responsive to fluid pressure within said system for controlling the delivery of fluid from said source to said system, a mechanism for controlling the delivery of desuperheating liquid to said system, and a temperature responsive device, responsive to the temperature of the fluid traversing said system cooperating with said pressure responsive means in controlling the operation of said mechanism.

3. In combination with a low pressure distribution system, a source of high pressure fluid, a valve for controlling the delivery of fluid from said source to said system, a regulator responsive to the fluid pressure in said system for controlling the operation of said valve, means for controlling the temperature of the fluid within said system, and a mechanism responsive to the temperature of liquid traversing said system cooperating with said regulator in controlling the operation of said means.

4. The combination with a steam line connected to a source of high pressure, of a valve for reducing the pressure in said line and means for cooling the steam flowing through said line including a water inlet to said line, a regulator for operating said valve so as to maintain a predetermined pressure in said line, a connection between said regulator and said cooling means and temperature responsive mechanism for cooperating with said regulator in controlling said cooling means.

5. The combination with a steam line of mechanism for cooling the steam flowing therethrough, a regulator for varying the effective operation of said cooling mechanism and means responsive to the temperature of the steam for operating said regulator, including a by-pass associated with said line and a thermostatic element in said by-pass and means responsive to the pressure in the steam line for modifying the effect of the thermostatic element upon said regulator.

6. The combination with a steam line of means for maintaining a predetermined pressure and temperature of steam therein including a flow controlling valve, a regulator responsive to the pressure in said line for controlling said valve, a water supply line associated with said steam line, valve in said water line, a connection between said regulator and said water valve so that said water valve is operated simultaneously with said steam valve, a second regulator for operating said water valve in accordance with the temperature of steam in said line.

7. In combination with a low pressure distribution system, a source of high pressure fluid, means responsive to fluid pressure within said system for controlling the delivery of fluid from said source to said system, a mechanism for reducing the temperature of the fluid traversing said system, and a temperature responsive device, responsive to the temperature of the fluid traversing said means cooperating with said first mentioned means in controlling said mechanism to maintain a substantially constant fluid temperature within said system.

8. In combination with a steam line, a source of steam supply, a source of cooling liquid supply, and means responsive to the fluid pressure and temperature within said line for controlling the delivery of steam and liquid to said line, said pressure responsive means acting upon said temperature responsive means to modify the effect of the latter upon the liquid delivery means.

9. In combination with a low pressure steam line, a source of high pressure steam supply, a source of cooling liquid supply, means responsive to the steam pressure within said line for controlling delivery to said line from both said sources and means responsive to the temperature of the fluid traversing said line for exerting a secondary control on the delivery of liquid from said liquid supply to said line.

10. In combination with a low pressure distribution system, a source of high pressure fluid supply, a source of cooling liquid supply, means responsive to the fluid pressure within said system for controlling the delivery of fluid and liquid from said sources to maintain a substantially constant fluid pressure within said system and means responsive to variations in the temperature of the fluid traversing said system for cooperating with said first mentioned control means, in controlling the delivery of liquid to said system from said source to maintain the temperature of the fluid traversing said system substantially constant.

11. In a control system for a steam flow line having high and low pressure sections, means for admitting water to the low pressure section and means for controlling the flow of steam from the high to the low pressure section, in combination with means for controlling the water admission means in response to variations in temperature in the low pressure section and means for controlling the steam flow control means in response to variations in pressure in the low pressure section, said steam pressure reponsive means acting to modify the effect of said temperature responsive means upon the water admission means.

12. In a control system for a steam flow line having high and low pressure sections, means for admitting water to the low pressure section and means for controlling the flow of steam from the high to the low pressure section, in combination with means for controlling the water admission means in response to variations in temperature in the low pressure section, and means for controlling the steam flow control means in response to variations in pressure in the low pressure section and means controlled by the pressure responsive means for modifying the effect of the temperature responsive means on the water admission means.

In testimony whereof, I have hereunto subscribed my name this 20th day of January, 1928.

THOMAS A. PEEBLES.